United States Patent [19]

Yamada et al.

[11] Patent Number: 5,421,025
[45] Date of Patent: May 30, 1995

[54] CELL PROCESSING SYSTEM HAVING FIRST AND SECOND PROCESSING UNITS CAPABLE OF OUTPUTTING FIRST AND SECOND PROCESSED SIGNALS AT THE SAME TIME

[75] Inventors: Kenji Yamada; Tatsuo Nakagawa; Naoto Honda, all of Tokyo, Japan

[73] Assignee: NEC Corporation, Tokyo, Japan

[21] Appl. No.: 220,357

[22] Filed: Mar. 31, 1994

[30] Foreign Application Priority Data

Mar. 31, 1993 [JP] Japan .................................. 5-073300
Mar. 31, 1993 [JP] Japan .................................. 5-073301

[51] Int. Cl.⁶ .................................................. G06F 5/00
[52] U.S. Cl. .................................. 395/800; 370/60.1; 370/91; 364/260; 364/260.1; 364/DIG. 1
[58] Field of Search ............... 395/800, 775, 650, 500, 395/200, 275; 370/58.2, 60.1, 85.1, 91, 94.1, 99

[56] References Cited

U.S. PATENT DOCUMENTS

| | | | |
|---|---|---|---|
| 4,926,416 | 5/1990 | Weik | 370/60.1 |
| 5,173,901 | 12/1992 | DeSomer | 370/112 |
| 5,204,857 | 4/1993 | Obara | 370/60 |
| 5,285,446 | 2/1994 | Yonehara | 370/60.1 |
| 5,301,189 | 4/1994 | Schmidt et al. | 370/60.1 |
| 5,303,233 | 4/1994 | Sugawara | 370/66 |
| 5,341,376 | 8/1994 | Yamashita | 370/99 |

Primary Examiner—Alyssa H. Bowler
Assistant Examiner—Alpesh M. Shah
Attorney, Agent, or Firm—Foley & Lardner

[57] ABSTRACT

Supplied with first and second signals from first and second control units (19, 29), first and second reading units (17, 27) read first and second readout ATM signals from first and second primary memory units (15, 25) which memorize an ATM signal (11). The second control unit produces the second-reading signal when a predetermined interval lapses after supplied with a first reading start signal from the first control unit. A first processing unit (21) processes the first readout ATM signal into a first STM signal and a first processed content signal. A second processing unit (31) processes, in response to the first processed content signal, the second readout ATM signal into a second STM signal. An output reading unit (35) read first and second output STM signals at the same time from first and second secondary memory units (23, 33) which memorize the first and the second readout STM signals.

16 Claims, 8 Drawing Sheets

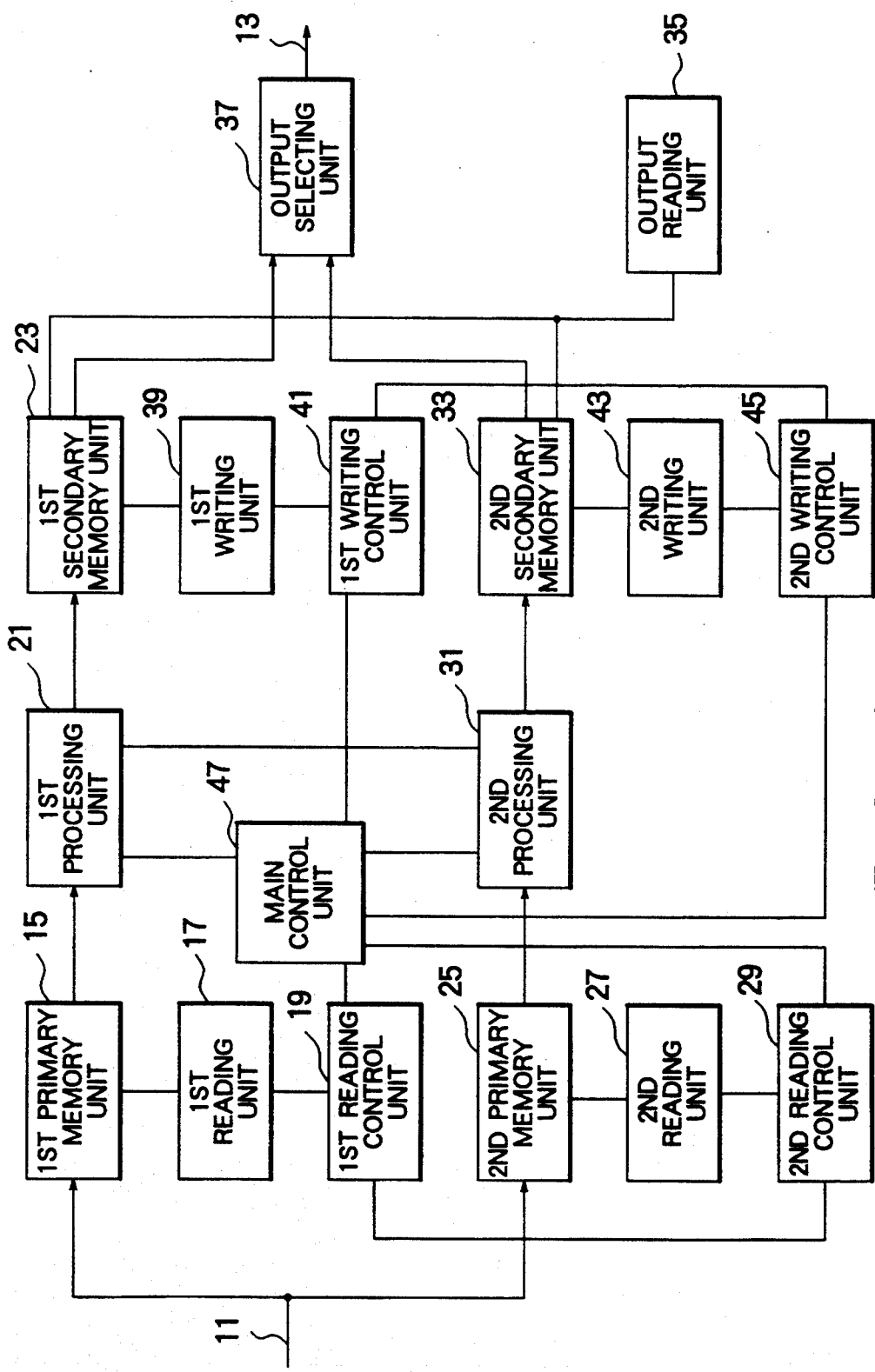
F I G. 2

CELL PROCESSING SYSTEM HAVING FIRST AND SECOND PROCESSING UNITS CAPABLE OF OUTPUTTING FIRST AND SECOND PROCESSED SIGNALS AT THE SAME TIME

BACKGROUND OF THE INVENTION

This invention relates to a cell processing system for processing an ATM (asynchronous transfer mode) signal into an STM (synchronous transfer mode or synchronous transport module) signal and to a cell processing system for processing an STM signal into an ATM signal.

A conventional cell processing system of the type described comprises a first processing device, a second processing device, and an output selecting device connected to the first and the second processing devices. The first processing device receives an ATM signal or an STM signal as a first input signal and processes the first input signal into a first processed signal. The second processing device receives an ATM signal or an STM signal as a second input signal and processes the second input signal into a second processed signal. The output selecting device receives the first and the second processed signals and periodically and alternatingly selects one of the first and the second processed signals to output the one of the first and the second processed signals as an output signal. Namely, the output selecting device periodically switches the first and the second processed signals.

In this conventional cell processing system, the first and the second processing device must stop to process the first and the second input signals while the output selecting device switches the first and the second processed signals. Also, this conventional cell processing system must accept to cancel a part of the first or the second processed signal in the first or the second processing device when the first and the second processing device do not stop to process the first and the second input signals while the output selecting device switches the first and the second processed signals.

SUMMARY OF THE INVENTION

It is an object of this invention to provide a cell processing system which need not stop to process the first and the second input signals while the output selecting device switches the first and the second processed signals.

It is another object of this invention to provide a cell processing system which need not cancel a part of the first or the second signal in the first or the second processing device even when the first and the second processing device do not stop to process the first and the second input signals while the output selecting device switches the first and the second processed signals.

Other objects of this invention will become clear as the description proceeds.

According to an aspect of this invention, there is provided a cell processing system which processes an ATM signal into an STM signal and which comprises (A) a first primary memory unit for receiving the ATM signal to memorize the ATM signal as a first memorized ATM signal; (B) a first reading unit connected to the first primary memory unit for reading the first memorized ATM signal out of the first primary memory unit as a first readout ATM signal when the first reading unit is supplied with a first reading signal; (C) a first reading control unit connected to the first reading unit for producing the first reading signal and a first reading start signal representing a start of the first reading signal; (D) a first processing unit connected to the first primary memory unit for processing the first readout ATM signal to produce a first STM signal and a first processed content signal representing a process of the first processing unit; (E) a first secondary memory unit connected to the first processing unit for receiving the first STM signal to memorize the first STM signal as a first memorized STM signal; (F) a second primary memory unit for receiving the ATM signal to memorize the ATM signal as a second memorized ATM signal; (G) a second reading unit connected to the second primary memory unit for reading the second memorized ATM signal out of the second primary memory unit as a second readout ATM signal when the second reading unit is supplied with a second reading signal; (H) a second reading control unit connected to the second reading unit and to the first reading control unit for producing the second reading signal when a first predetermined time interval lapses after the second reading control unit is supplied with the first reading start signal; (I) a second processing unit connected to the second primary memory unit and to the first processing unit for processing, in response to the first processed content signal, the second readout ATM signal to produce a second STM signal; (J) a second secondary memory unit connected to the second processing unit for receiving the second STM signal to memorize the second STM signal as a second memorized STM signal; (K) an output reading unit connected to the first and the second secondary memory units for reading the first and the second memorized STM signal at the same time out of the first and the second secondary memory units as first and second output STM signals; and (L) an output selecting unit connected to the first and the second secondary memory units for selecting one of the first and the second output STM signals to output the one of the first and the second output STM signals am the STM signal when the output selecting unit is supplied with one of first and second selection signals.

According to another aspect of this invention, there is provided a cell processing system which processes an ATM signal into an STM signal and which comprises (A) a main control unit for producing first, second, and third input control signals and first, second, and third processing control signals; (B) a first primary memory unit for receiving the ATM signal to memorize the ATM Signal as a first memorized ATM signal; (C) a first reading unit connected to the first primary memory unit for reading the first memorized ATM signal out of the first primary memory unit as a first readout ATM signal when the first reading unit is supplied with a first reading signal; (D) a first reading control unit connected to the first reading unit and to the main control unit for producing the first reading signal when the first reading control unit is supplied with the first input control signal and for producing the first reading signal and a first reading start signal representing a start of the first reading signal when the first reading control unit is supplied with the first and the third input control signals and for producing the first reading signal when a first predetermined time interval lapses after the first reading control unit is supplied with a second reading start signal; (E) a first processing unit connected to the first primary memory unit and to the main control unit for processing the first readout ATM signal to produce a first STM signal when the first processing unit is supplied with the first processing control signal and for processing the first readout ATM signal to produce the first STM signal and a first processed content signal representing a process of the first processing unit when the first processing unit is supplied with the first and the third processing control signal and for processing, in response to a second processed content signal, the first readout ATM signal to produce the first STM signal when the first processing unit is supplied with the second processed content signal; (F) a first secondary memory unit connected to the first processing unit for receiving the first STM signal to memorize the first STM signal as a first memorized STM signal; (G) a second primary memory unit for receiving the ATM signal to memorize the ATM signal as a second memorized ATM signal; (H) a second reading unit connected to the second primary memory unit for reading the second memorized ATM signal out of the second primary memory unit as a second readout ATM signal when the second reading unit is supplied with a second reading signal; (I) a second reading control unit connected to the second reading unit, to the first reading control unit, and to the main control unit for producing the second reading signal when the second reading control unit is supplied with the second input control signal and for producing the second reading signal and the second reading start signal representing a start of the second reading signal when the second reading control unit is supplied with the second and the third input control signals and for producing the second reading signal when a second predetermined time interval lapses after the second reading control unit is supplied with the first reading start signal; (J) a second processing unit connected to the second primary memory unit, to the first processing unit, and to the main control unit for processing the second readout ATM signal to produce a second STM signal when the second processing unit is supplied with the second processing control signal and for processing the second readout ATM signal to produce the second STM signal and the second processed content signal representing a process of the second processing unit when the second processing unit is supplied with the second and the third processing control signal and for processing, in response to the first processed content signal, the second readout ATM signal to produce the second STM signal when the Second processing unit is supplied with the first processed content signal; (K) a second secondary memory unit connected to the second processing unit for receiving the second STM signal to memorize the second STM signal as a second memorized STM signal; (L) an output reading unit connected to the first and the second secondary memory units for reading the first and the second memorized STM signal at the same time out of the first and the second secondary memory units as first and second output STM signals; and (M) an output selecting unit connected to the first and the second secondary memory units for selecting one of the first and the second output STM signals to output the one of the first and the second output STM signals as the STM signal when the output selecting unit is supplied with one of first and second selection signals.

According to still another aspect of this invention, there is provided a cell processing system which processes an ATM signal into an STM signal and which comprises (A) a main control unit for producing first, second, and third input control signals, and first and second selection signals; (B) an input control unit connected to the main control unit for receiving the ATM signal to produce a first ATM signal when the input control unit is supplied with the first input control signal, a second ATM signal when the input control unit is supplied with the second input control signal, and the first and the second ATM signals when the input control unit is supplied with the third input control signal, each of the first and the second ATM signals being equal to the ATM signal; (C) a first primary memory unit connected to the input control unit for receiving the first ATM signal to memorize the first ATM signal as a first memorized ATM signal; (D) a first reading unit connected to the first primary memory unit for reading the first memorized ATM signal out of the first primary memory unit as a first readout ATM signal when the first reading unit is supplied with a first reading signal; (E) a first reading control unit connected to the first reading unit for producing the first reading signal and a first reading start signal representing a start of the first reading signal; (F) a first processing unit connected to the first primary memory unit for processing the first readout ATM signal to produce a first STM signal and a first processed content signal representing a process of the first processing unit; (G) a first secondary memory unit connected to the first processing unit for receiving the first STM signal to memorize the first STM signal as a first memorized STM signal; (H) a second primary memory unit connected to the input control unit for receiving the second ATM signal to memorize the second ATM signal as a second memorized ATM signal; (I) a second reading unit connected to the second primary memory unit for reading the second memorized ATM signal out of the second primary memory unit as a second readout ATM signal when the second reading unit is supplied with a second reading signal; (J) a second reading control unit connected to the second reading unit and to the first reading control unit for producing the second reading signal when a first predetermined time interval lapses after the second reading control unit is supplied with the first reading start signal; (K) a second processing unit connected to the second primary memory unit and to the first processing unit for processing, in response to the first processed content signal, the second readout ATM signal to produce a second STM signal; (L) a second secondary memory unit connected to the second processing unit for receiving the second STM signal to memorize the second STM signal as a second memorized STM signal; (M) an output reading unit connected to the first and the second secondary memory units for reading the first and the second memorized STM signal at the same time out of the first and the second secondary memory units as first and second output STM signals; and (N) an output selecting unit connected to the first and the second secondary memory units and to the main control unit for selecting one of the first and the second output STM signals to output the one of the first and the second output STM signals as the STM signal when the output selecting unit is supplied with one of the first and the second selection signals.

According to yet another aspect of this invention, there is provided a cell processing system which processes an ATM signal into an STM signal and which comprises (A) a main control unit for producing first, second, and third input control signals, first, second, and third processing control signals, and first and second selection signals; (B) an input control unit connected to the main control unit for receiving the ATM signal to produce a first ATM signal when the input control unit is supplied with the first input control signal, a second ATM signal when the input control unit is supplied with the second input control signal, and the first and the second ATM signals when the input control unit is supplied with the third input control signal, each of the first and the second ATM signals being equal to the ATM signal; (C) a first primary memory unit connected to the input control unit for receiving the first ATM signal to memorize the first ATM signal as a first memorized ATM signal; (D) a first reading unit connected to the first primary memory unit for reading the first memorized ATM signal out of the first primary memory unit as a first readout ATM signal when the first reading unit is supplied with a first reading signal; (E) a first reading control unit connected to the first reading unit and to the main control unit for producing the first reading signal when the first reading control unit is supplied with the first input control signal and for producing the first reading signal and a first reading start signal representing a start of the first reading signal when the first reading control unit is supplied with the first and the third input control signals and for producing the first reading signal when a first predetermined time interval lapses after the first reading control unit is supplied with a second reading start signal; (F) a first processing unit connected to the first primary memory unit and to the main control unit for processing the first readout ATM signal to produce a first STM signal when the first processing unit is supplied with the first processing control signal and for processing the first readout ATM signal to produce the first STM signal and a first processed content signal representing a process of the first processing unit when the first processing unit is supplied with the first and the third processing control signal and for processing, in response to a second processed content signal, the first readout ATM signal to produce the first STM signal when the first processing unit is supplied with the second processed content signals (G) a first secondary memory unit connected to the first processing unit for receiving the first STM Signal to memorize the first STM signal as a first memorized STM signal; (H) a second primary memory unit connected to the input control unit for receiving the second ATM signal to memorize the second ATM signal as a second memorized ATM signal; (I) a second reading unit connected to the second primary memory unit for reading the second memorized ATM signal out of the second primary memory unit as a second readout ATM signal when the second reading unit is supplied with a second reading signals (J) a second reading control unit connected to the second reading unit, to the first reading control unit, and to the main control unit for producing the second reading signal when the second reading control unit is supplied with the second input control signal and for producing the second reading signal and the second reading start signal representing a start of the second reading signal when the second reading control unit is supplied with the second and the third input control signals and for producing the second reading signal when a second predetermined time interval lapses alter the second reading control unit is supplied with the first reading start signal; (K) a second processing unit connected to the second primary memory unit and to the main control unit for processing the second readout ATM signal to produce a second STM signal when the second processing unit is supplied with the second processing control signal and for processing the second readout ATM signal to produce the second STM signal and the second processed content signal representing a process of the second processing unit when the second processing unit is supplied with the second and the third processing control signal and for processing, in response to the first processed content signal, the second readout ATM signal to produce the second STM signal when the second processing unit is supplied with the first processed content signal; (L) a second secondary memory unit connected to the second processing unit for receiving the second STM signal to memorize the second STM signal as a second memorized STM signal; (M) an output reading unit connected to the first and the second secondary memory units for reading the first and the second memorized STM signal at the same time out of the first and the second secondary memory units as first and second output STM signals; and (N) an output selecting unit connected to the first and the second secondary memory unite and to the main control unit for selecting one of the first and the second output STM signals to output the one of the first and the second output STM signals as the STM signal when the output selecting unit is supplied with one of the first and the second selection signals.

According to a different aspect of this invention, there is provided a cell processing system which processes an STM signal into an ATM signal and which comprises (A) a first primary memory unit for receiving the STM signal to memorize the STM signal as a first memorized STM signal; (B) a first reading unit connected to the first primary memory unit for reading the first memorized STM signal out of the first primary memory unit as a first readout STM signal when the first reading unit is supplied with a first reading signal; (C) a first reading control unit connected to the first reading unit for producing the first reading signal and a first reading start signal representing a start of the first reading signal; (D) a first processing unit connected to the first primary memory unit for processing the first readout STM signal to produce a first ATM signal and a first processed content signal representing a process of the first processing unit; (E) a first secondary memory unit connected to the first processing unit for receiving the first ATM signal to memorize the first ATM signal as a first memorized ATM signal; (F) a second primary memory unit for receiving the STM signal to memorize the STM signal as a second memorized STM signal; (G) a second reading unit connected to the second primary memory unit for reading the second memorized STM signal out of the second primary memory unit as a second readout STM signal when the second reading unit is supplied with a second reading signal; (H) a second reading control unit connected to the second reading unit and to the first reading control unit for producing the second reading signal when a first predetermined time interval lapses after the second reading control unit is supplied with the first reading stark signal; (I) a second processing unit connected to the second primary memory unit and to the first processing unit for processing, in response to the first processed content signal, the second readout STM signal to produce a second ATM signal; (J) a second secondary memory unit connected to the second processing unit for receiving the second ATM signal to memorize the second ATM signal as a second memorized ATM signal; (K) an output reading unit connected to the first and the second secondary memory units for reading the first and the second memorized ATM signal at the same time out of the first and the second secondary memory units as first and second output ATM signals; and (L) an output selecting unit connected to the first and the second secondary memory units for selecting one of the first and the second output ATM signals to output the one of the first and the second output ATM signals as the ATM signal when the output selecting unit is supplied with one of first and second selection signals.

According to another different aspect of this invention, there is provided a cell processing system which processes an STM signal into an ATM signal and which comprises (A) a main control unit for producing first, second, and third input control signals and first, second, and third processing control signals; (B) a first primary memory unit for receiving the STM signal to memorize the STM signal as a first memorized STM signal; (C) a first reading unit connected to the first primary memory unit for reading the first memorized STM signal out of the first primary memory unit as a first readout STM signal when the first reading unit is supplied with a first reading signal; (D) a first reading control unit connected to the first reading unit and to the main control unit for producing the first reading signal when the first reading control unit is supplied with the first input control signal end for producing the first reading signal and a first reading start signal representing a start of the first reading signal when the first reading control unit is supplied with the first and the third input control signals and for producing the first reading signal when a first predetermined time interval lapses after the first reading control unit is supplied with a second reading start signal; (E) a first processing unit connected to the first primary memory unit and to the main control unit for processing the first readout STM signal to produce a first ATM signal when the first processing unit is supplied with the first processing control signal and for processing the first readout STM signal to produce the first ATM signal and a first processed content signal representing a process of the first processing unit when the first processing unit is supplied with the first and the third processing control signal and for processing, in response to a second processed content signal, the first readout STM signal to produce the first ATM signal when the first processing unit is supplied with the second processed content signal; (F) a first secondary memory unit connected to the first processing unit for receiving the first ATM signal to memorize the first ATM signal as a first memorized ATM signal; (G) a second primary memory unit for receiving the STM signal to memorize the STM signal as a second memorized STM signal; (H) a second reading unit connected to the second primary memory unit for reading the second memorized STM signal out of the second primary memory unit as a second readout STM signal when the second reading unit is supplied with a second reading signal; (I) a second reading control unit connected to the second reading unit, to the first reading control unit, and to the main control unit for producing the second reading signal when the second reading control unit is supplied with the second input control signal and for producing the second reading signal and the second reading start signal representing a start of the second reading signal when the second reading control unit is supplied with the second and the third input control signals and for producing the second reading signal when a second predetermined time interval lapses after the second reading control unit is supplied with the first reading start signal; (J) a second processing unit connected to the second primary memory unit, to the first processing unit, and to the main control unit for processing the second readout STM signal to produce a second ATM signal when the second processing unit is supplied with the second processing control signal and for processing the second readout STM signal to produce the second ATM signal and the second processed content signal representing a process of the second processing unit when the second processing unit is supplied with the second and the third processing control signal and for processing, in response to the first processed content signal, the second readout STM signal to produce the second ATM signal when the second processing unit is supplied with the first processed content signal; (K) a second secondary memory unit connected to the second processing unit for receiving the second ATM signal to memorize the second ATM signal as a second memorized ATM signal; (L) an output reading unit connected to the first and the second secondary memory units for reading the first and the second memorized ATM signal at the same time out of the first and the second secondary memory units as first and second output ATM signals; and (M) an output selecting unit connected to the first and the second secondary memory units for selecting one of the first and the second output ATM signals to output the one of the first and the second output ATM signals as the ATM signal when the output selecting unit is supplied with one of first and second selection signals.

According to still another different aspect of this invention, there is provided a cell processing system which processes an STM signal into an ATM signal and which comprises (A) a main control unit for producing first, second, and third input control signals, and first and second selection signals; (B) an input control unit connected to the main control unit for receiving the STM signal to produce a first STM signal when the input control unit is supplied with the first input control signal, a second STM signal when the input control unit is supplied with the second input control signal, and the first and the second STM signals when the input control unit is supplied with the third input control signal, each of the first and the second STM signals being equal to the STM signal; (C) a first primary memory unit connected to the input control unit for receiving the first STM signal to memorize the first STM signal as a first memorized ATM signal; (D) a first reading unit connected to the first primary memory unit for reading the first memorized STM signal out of the first primary memory unit as a first readout STM signal when the first reading unit is supplied with a first reading signal; (E) a first reading control unit connected to the first reading unit for producing the first reading signal and a first reading start signal representing a start of the first reading signal; (F) a first processing unit connected to the first primary memory unit for processing the first readout STM signal to produce a first ATM signal and a first processed content signal representing a process of the first processing unit; (G) a first secondary memory unit connected to the first processing unit for receiving the first ATM signal to memorize the first ATM signal as a first memorized ATM signal; (H) a second primary memory unit connected to the input control unit for receiving the second STM signal to memorize the second STM signal as a second memorized STM signal; (I) a second reading unit connected to the second primary memory unit for reading the second memorized STM signal out of the second primary memory unit as a second readout STM signal when the second reading unit is supplied with a second reading signal; (J) a second reading control unit connected to the second reading unit and to the first reading control unit for producing the second reading signal when a first predetermined time interval lapses after the second reading control unit is supplied with the first reading start signal; (K) a second processing unit connected to the second primary memory unit and to the first processing unit for processing, in response to the first processed content signal, the second readout STM signal to produce a second ATM signal; (L) a second secondary memory unit connected to the second processing unit for receiving the second ATM signal to memorize the second ATM signal as a second memorized ATM signal; (M) an output reading unit connected to the first and the second secondary memory units for reading the first and the second memorized ATM signal at the same time out of the first and the second secondary memory units as first and second output ATM signals; and (N) an output selecting unit connected to the first and the second secondary memory units and to the main control unit for selecting one of the first and the second output ATM signals to output the one of the first and the second output ATM signals as the ATM signal when the output selecting unit is supplied with one of the first and the second selection signals.

According to yet another different aspect of this invention, there is provided a cell processing system which processes an STM signal into an ATM signal and which comprises (A) a main control unit for producing first, second, and third input control signals, first, second, and third processing control signals, and first and second selection signals; (B) an input control unit connected to the main control unit for receiving the STM signal to produce a first STM signal when the input control unit is supplied with the first input control signal, a second STM signal when the input control unit is supplied with the second input control signal, and the first and the second STM signals when the input control unit is supplied with the third input control signal, each of the first and the second STM signals being equal to the STM signal; (C) a first primary memory unit connected to the input control unit for receiving the first STM signal to memorize the first STM signal as a first memorized STM signal; (D) a first reading unit connected to the first primary memory unit for reading the first memorized STM Signal out of the first primary memory unit as a first readout STM signal when the first reading unit is supplied with a first reading signal; (E) a first reading control unit connected to the first reading unit and to the main control unit for producing the first reading signal when the first reading control unit is supplied with the first input control signal and for producing the first reading signal and a first reading start signal representing a start of the first reading signal when the first reading control unit is supplied with the first and the third input control signals and for producing the first reading signal when a first predetermined time interval lapses after the first reading control unit is supplied with a second reading start signal; (F) a first processing unit connected to the first primary memory unit and to the main control unit for processing the first readout STM signal to produce a first ATM signal when the first processing unit is supplied with the first processing control signal and for processing the first readout STM signal to produce the first ATM signal and a first processed content signal representing a process of the first processing unit when the first processing unit is supplied with the first and the third processing control signal and for processing, in response to a second processed content signal, the first readout STM signal to produce the first ATM signal when the first processing unit is supplied with the second processed content signal; (G) a first secondary memory unit connected to the first processing unit for receiving the first ATM signal to memorize the first ATM signal as a first memorized ATM signal; (H) a second primary memory unit connected to the input control unit for receiving the second STM signal to memorize the second STM signal as a second memorized STM signal; (I) a second reading unit connected to the second primary memory unit for reading the second memorized STM signal out of the second primary memory unit as a second readout STM signal when the second reading unit is supplied with a second reading signal; (J) a second reading control unit connected to the second reading unit, to the first reading control unit, and to the main control unit for producing the second reading signal when the second reading control unit is supplied with the second input control signal and for producing the second reading signal and the second reading start signal representing a start of the second reading signal when the second reading control unit is supplied with the second and the third input control signals and for producing the second reading signal when a second predetermined time interval lapses after the second reading control unit is supplied with the first reading start signal; (K) a second processing unit connected to the second primary memory unit and to the main control unit for processing the second readout STM signal to produce a second ATM signal when the second processing unit is supplied with the second processing control signal and for processing the second readout STM signal to produce the second ATM signal and the second processed content signal representing a process of the second processing unit when the second processing unit is supplied with the second and the third processing control signal and for processing, in response to the first processed content signal, the second readout STM signal to produce the second ATM signal when the second processing unit is supplied with the first processed content signal; (L) a second secondary memory unit connected to the second processing unit for receiving the second ATM signal to memorize the second ATM signal as a second memorized ATM signal; (M) an output reading unit connected to the first and the second secondary memory units for reading the first and the second memorized ATM signal at the same time out of the first and the second secondary memory units as first and second output ATM signals; and (N) an output selecting unit connected to the first and the second secondary memory units and to the main control unit for selecting one of the first and the second output ATM signals to output the one of the first and the second output ATM signals as the ATM signal when the output selecting unit is supplied with one of the first and the second selection signals.

BRIEF DESCRIPTION OF THE DRAWING

FIG. 2 is a block diagram of a cell processing system according to a second embodiment of this invention;

DESCRIPTION OF THE PREFERRED EMBODIMENTS

Figure 1:
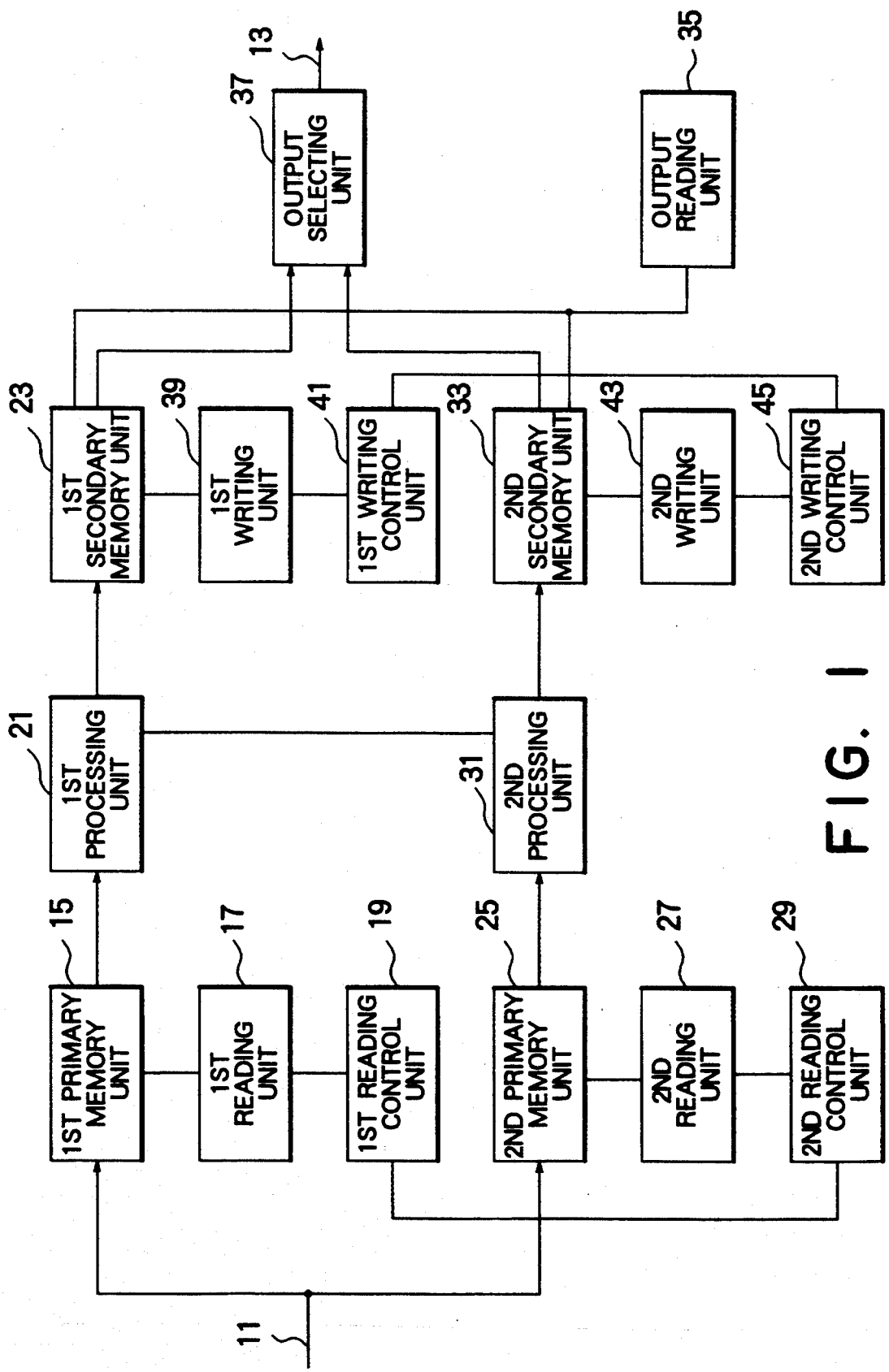
FIG. 1 is a block diagram of a cell processing system according to a first embodiment of this invention.

Referring to FIG. 1, the description will proceed to a cell processing system according to a first embodiment of this invention.

The cell processing system receives an ATM signal 11 and processes the ATM signal 11 into an STM signal 13 to output the STM signal 13. The cell processing system comprises a first primary memory unit 15 which receives the ATM signal 11 to memorize the ATM signal 11 as a first memorized ATM signal. The first primary memory unit 15 comprises a first-in first-out (FIFO) memory device. A first reading unit 17 is connected to the first primary memory unit 15 and reads the first memorized ATM signal out of the first primary memory unit 15 as a first readout ATM signal when the first reading unit 17 is supplied with a first reading signal. A first reading control unit 19 is connected to the first reading unit 17 and produces the first reading signal and a first reading start signal representing a start of the first reading signal. A first processing unit 21 is connected to the first primary memory unit 15 and processes the first readout ATM signal to produce a first STM signal and a first processed content signal representing a process of the first processing unit 21.

A first secondary memory unit 23 is connected to the first processing unit 21 and receives the first STM signal to memorize the first STM signal as a first memorized STM signal. The first secondary memory unit 23 comprises a FIFO memory device. A second primary memory unit 25 receives the ATM signal 11 to memorize the ATM signal 11 as a second memorized ATM signal. The second primary memory unit 25 comprises a FIFO memory device. A second reading unit 27 is connected to the second primary memory unit 25 and reads the second memorized ATM signal out of the second primary memory unit 25 as a second readout ATM signal when the second reading unit 27 is supplied with a second reading signal. A second reading control unit 29 is connected to the second reading unit 27 and to the first reading control unit 19 and produces the second reading signal when a first predetermined time interval lapses after the second reading control unit 29 is supplied with the first reading start signal. A second processing unit 31 is connected to the second primary memory unit 25 and to the first processing unit 21 and processes, in response to the first processed content signal, the second readout ATM signal to produce a second STM signal. As a result, a second process of the second processing unit 31 is equal to the first process of the first processing unit 21.

A second secondary memory unit 33 is connected to the second processing unit 31 and receives the second STM signal to memorize the second STM signal as a second memorized STM signal. The second secondary memory unit 33 comprises a FIFO memory device. An output reading unit 35 is connected to the first and the second secondary memory units 23 and 33 and reads the first and the second memorized STM signal at the same time out of the first and the second secondary memory units 23 and 33 as first and second output STM signals. An output selecting unit 37 is connected to the first and the second secondary memory units 23 and 33 and selects one of the first and the second output STM signals to output the one of the first and the second output STM signals as the STM signal 13 when the output selecting unit 37 is supplied with one of first and second selection signals.

A first writing unit 39 is connected to the first secondary memory unit 23 and writes the first STM signal in the first secondary memory unit 23 as the first memorized STM signal when the first writing unit 39 is supplied with a first writing signal. A first writing control unit 41 is connected to the first writing unit 39 and produces the first writing signal and a first writing start signal representing a start of the first writing signal.

A second writing unit 43 is connected to the second secondary memory unit 33 and writes the second STM signal in the second secondary memory unit 33 as the second memorized STM signal when the second writing unit 43 is supplied with a second writing signal. A second writing control unit 45 is connected to the second writing unit 43 and to the first writing control unit 41 and produces the second writing signal when a second predetermined time interval lapses after the second writing control unit 45 is supplied with the first writing start signal.

Referring to FIG. 2, the description will proceed to a cell processing system according to a second embodiment of this invention. Similar parts are designated by like reference numerals.

The cell processing system comprises a main control unit 47 which produces first, second, and third input control signals, first, second, and third processing control signals, and the first, the second, and third writing control signals. The first reading control unit 19 is connected to the first reading unit 17 and to the main control unit 47 and produces the first reading signal when the first reading control unit 19 is supplied with the first input control signal. The first reading control unit 19 produces the first reading signal and the first reading start signal representing the start of the first reading signal when the first reading control unit 19 is supplied with the first and the third input control signals. The first reading control unit 19 produces the first reading signal when a first predetermined time interval lapses after the first reading control unit 19 is supplied with a second reading start signal.

The first processing unit 21 is connected to the first primary memory unit 15 and to the main control unit 47 and processes the first readout ATM signal to produce the first STM signal when the first processing unit 21 is supplied with the first processing control signal. The first processing unit 21 processes the first readout ATM signal to produce the first STM signal and the first processed content signal representing the process of the first processing unit 21 when the first processing unit 21 is supplied with the first and the third processing control signals. The first processing unit 21 processes, in response to a second processed content signal, the first readout ATM Signal to produce the first STM signal when the first processing unit 21 is supplied with the second processed content signal. The second reading control unit 29 is connected to the second reading unit 27, to the first reading control unit 19, and to the main control unit 47 and produces the second reading signal when the second reading control unit 29 is supplied with the second input control signal. The second reading control unit 29 produces the second reading signal and the second reading start signal representing a start of the second reading signal when the second reading control unit 29 is supplied with the second and the third input control signals. The second reading control unit 29 produces the second reading signal when a second predetermined time interval lapses after the second reading control unit 29 is supplied with the first reading start signal.

The second processing unit 31 is connected to the second primary memory unit 25, to the first processing unit 21, and to the main control unit 47 and processes the second readout ATM signal to produce the second STM signal when the second processing unit 31 is supplied with the second processing control signal. The second processing unit 31 processes the second readout ATM signal to produce the second STM signal and the second processed content signal representing the second process of the second processing unit 31 when the second processing unit 31 is supplied with the second and the third processing control signals. The second processing unit 31 processes, in response to the first processed content signal, the second readout ATM signal to produce the second STM signal when the second processing unit 31 is supplied with the first processed content signal. The second process of the second processing unit 31 is equal to the first process of the first processing unit 21.

The first writing unit 39 is connected to the first secondary memory unit 23 and writes the first STM signal in the first secondary memory unit 23 as the first memorized STM signal when the first writing unit 39 is supplied with the first writing signal.

The first writing control unit 41 is connected to the first writing unit 39 and to the main control unit 47 and produces the first writing signal when the first writing control unit 41 is supplied with the first writing control signal. The first writing control unit 41 produces the first writing signal and the first writing start signal representing the start of the first writing signal when the first writing control unit 41 is supplied with the first and the third writing control signals and produces the first writing signal when a primary determined time interval lapses after the first writing control unit is supplied with a second writing start signal.

The second writing unit 43 is connected to the second secondary memory unit 33 and writes the second STM signal in the second secondary memory unit 33 as the second memorized STM signal when the second writing unit is supplied with the second writing signal.

The second writing control unit 45 is connected to the second writing unit 43, to the first writing control unit 41, and to the main control unit 47 and produces the second writing signal when the second writing control unit 45 is supplied with the second writing control signal. The second writing control unit 45 produces the second writing signal and the second writing start signal representing a start of the second writing signal when the second writing control unit 45 is supplied with the second and the third writing control signals. The second writing control unit 45 produces the second writing signal when a secondary predetermined time interval lapses after the second writing control unit 45 is supplied with the first writing start signal.

Figure 3:
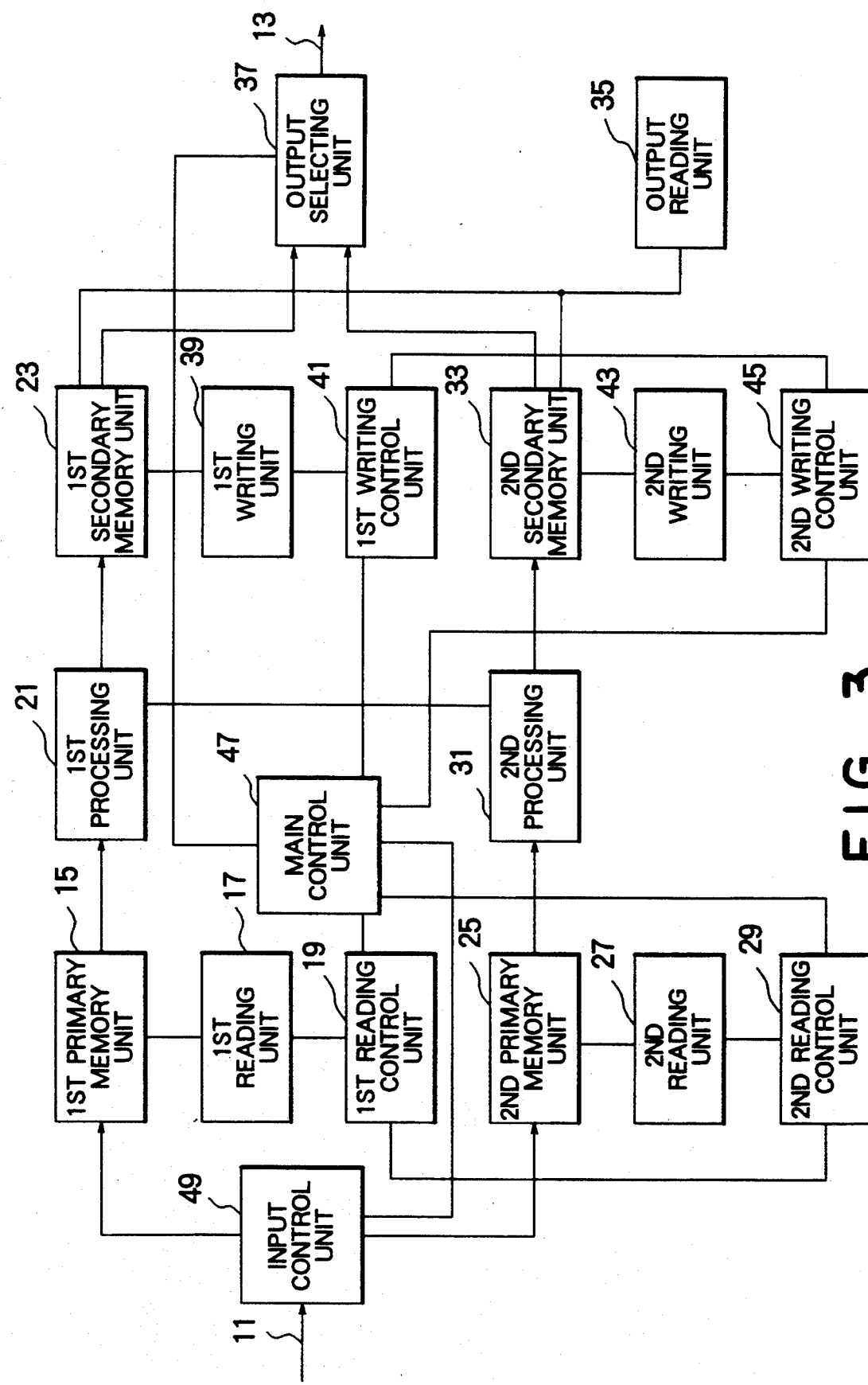
FIG. 3 is a block diagram of a cell processing system according to a third embodiment of this invention.

Referring to FIG. 3, the description will proceed to a cell processing system according to a third embodiment of this invention. Similar parts are designated by like reference numerals.

The cell processing system comprises the main control unit 47 which produces the first, the second, and the third input control signals, the first, the second, and the third writing control signals, and the first and the second selection signals. The cell processing system comprises an input control unit 49 is connected to the main control unit 47 and receives the ATM signal to produce the first ATM signal when the input control unit 49 is supplied with the first input control signal, the second ATM signal when the input control unit 49 is supplied with the second input control signal, and the first and the second ATM signals when the input control unit 49 is supplied with the third input control signal. Each of the first and the second ATM signals is equal to the ATM signal. The first primary memory unit 15 is connected to the input control unit 49 and receives the first ATM signal to memorize the first ATM signal as the first memorized ATM signal. The second primary memory unit 25 is connected to the input control unit 49 and receives the second ATM signal to memorize the second ATM signal as the second memorized ATM signal. The output selecting unit 47 is connected to the first and the second secondary memory units 23 and 33 and to the main control unit 47 and selects one of the first and the second output STM signals to output the one of the first and the second output STM signals as the STM signal when the output selecting unit 37 is supplied with one of the first and the second selection signals.

Figure 4:
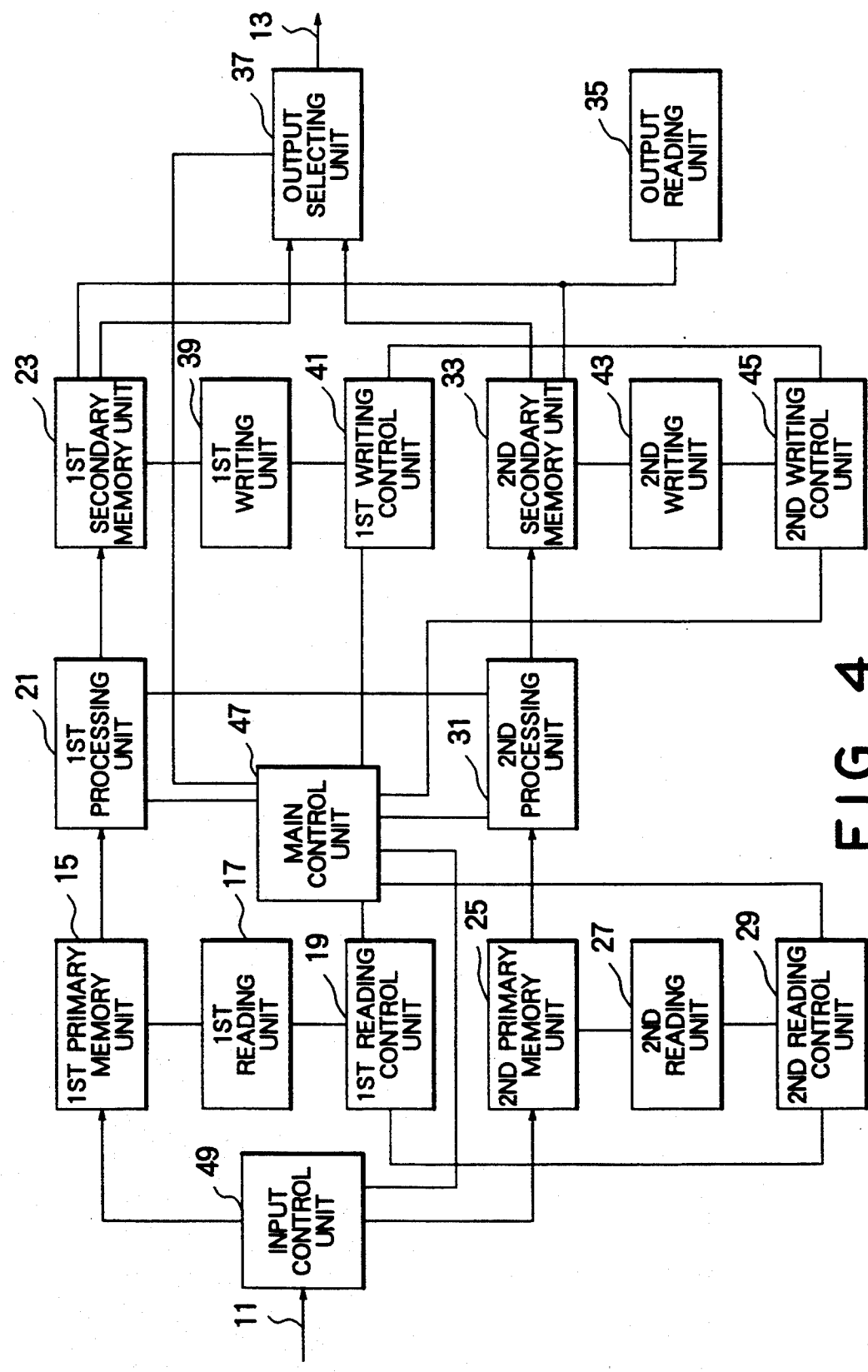
FIG. 4 is a block diagram of a cell processing system according to a fourth embodiment of this invention.

Referring to FIG. 4, the description will proceed to a cell processing system according to a fourth embodiment of this invention. Similar parts are designated by like reference numerals.

The cell processing system comprises the main control unit 47 which produces the first, the second, and the third input control signals, the first, the second, and the third processing control signals, the first, the second, and the third writing control signals, and the first and the second selection signals.

Figure 5:
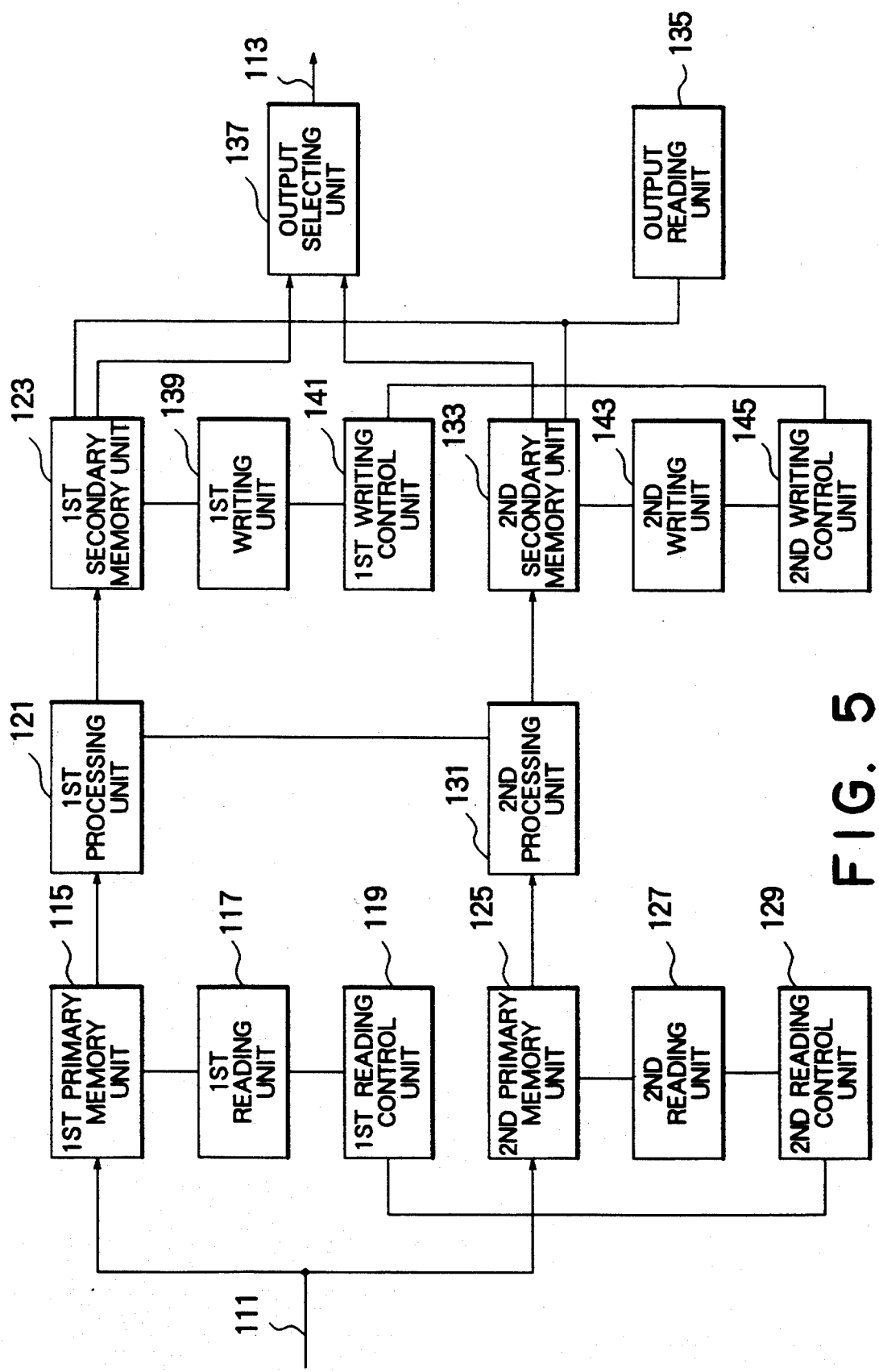
FIG. 5 a block diagram of a cell processing system according to a fifth embodiment of this invention.

Referring to FIG. 5, the description will proceed to a cell processing system according to a fifth embodiment of this invention.

The cell processing system receives an STM signal 111 and processes the STM signal 111 into an ATM signal 113 to output the ATM signal 113. The cell processing system comprises a first primary memory unit 115 which receives the STM signal 111 to memorize the STM signal 111 as a first memorized STM signal. The first primary memory unit 115 comprises a first-in first-out (FIFO) memory device. A first reading unit 117 is connected to the first primary memory unit 115 and reads the first memorized STM signal out of the first primary memory unit 115 as a first readout STM signal when the first reading unit 117 is supplied with the first reading signal. A first reading control unit 119 is connected to the first reading unit 117 and produces the first reading signal and the first reading start signal representing the start of the first reading signal.

A first processing unit 121 is connected to the first primary memory unit 115 and processes the first readout STM signal to produce a first ATM signal and the first processed content signal representing the first process of the first processing unit 121. A first secondary memory unit 123 is connected to the first processing unit 121 and receives the first ATM signal to memorize the first ATM signal as a first memorized ATM signal. The first secondary memory unit 23 comprises a FIFO memory device. A second primary memory unit 125 receives the STM signal 111 to memorize the ATM signal 111 as a second memorized STM signal. The second primary memory unit 25 comprises a FIFO memory device. A second reading unit 127 is connected to the second primary memory unit 125 and reads the second memorized STM signal out of the second primary memory unit 125 as a second readout STM signal when the second reading unit 127 is supplied with the second reading signal. A second reading control unit 129 is connected to the second reading unit 127 and to the first reading control unit 119 and produces the second reading signal when the first predetermined time interval lapses after the second reading control unit 129 is supplied with the first reading start signal.

A second processing unit 131 is connected to the second primary memory unit 125 and to the first processing unit 121 and processes, in response to the first processed content signal, the second readout STM signal to produce a second ATM signal. As a result, the second process of the second processing unit 131 is equal to the first process of the first processing unit 121. A second secondary memory unit 133 is connected to the second processing unit 131 and receives the second ATM signal to memorize the second ATM signal as a second memorized ATM signal. The second secondary memory unit 133 comprises a FIFO memory devise. An output reading unit 135 is connected to the first and the second secondary memory units 123 and 133 and reads the first and the second memorized ATM signal at the same time out of the first and the second secondary memory units 123 and 133 as first and second output ATM signals. An output selecting unit 137 is connected to the first and the second secondary memory units 123 and 133 and selects one of the first and the second output ATM signals to output the one of the first and the second output ATM signals as the ATM signal 113 when the output selecting unit 137 is supplied with one of first and second selection signals.

A first writing unit 139 is connected to the first secondary memory unit 123 and writes the first ATM signal in the first secondary memory unit 123 as the first memorized ATM signal when the first writing unit 139 is supplied with the first writing signal. A first writing control unit 141 is connected to the first writing unit 139 and produces the first writing signal and the first writing start signal representing the start of the first writing signal. A second writing unit 143 is connected to the second secondary memory unit 133 and writes the second ATM signal in the second secondary memory unit 133 as the second memorized ATM signal when the second writing unit 143 is supplied with the second writing signal. A second writing control unit 145 is connected to the second writing unit 143 and to the first writing control unit 141 and produces the second writing signal when the second predetermined time interval lapses after the second writing control unit 145 is supplied with the first writing start signal.

Figure 6:
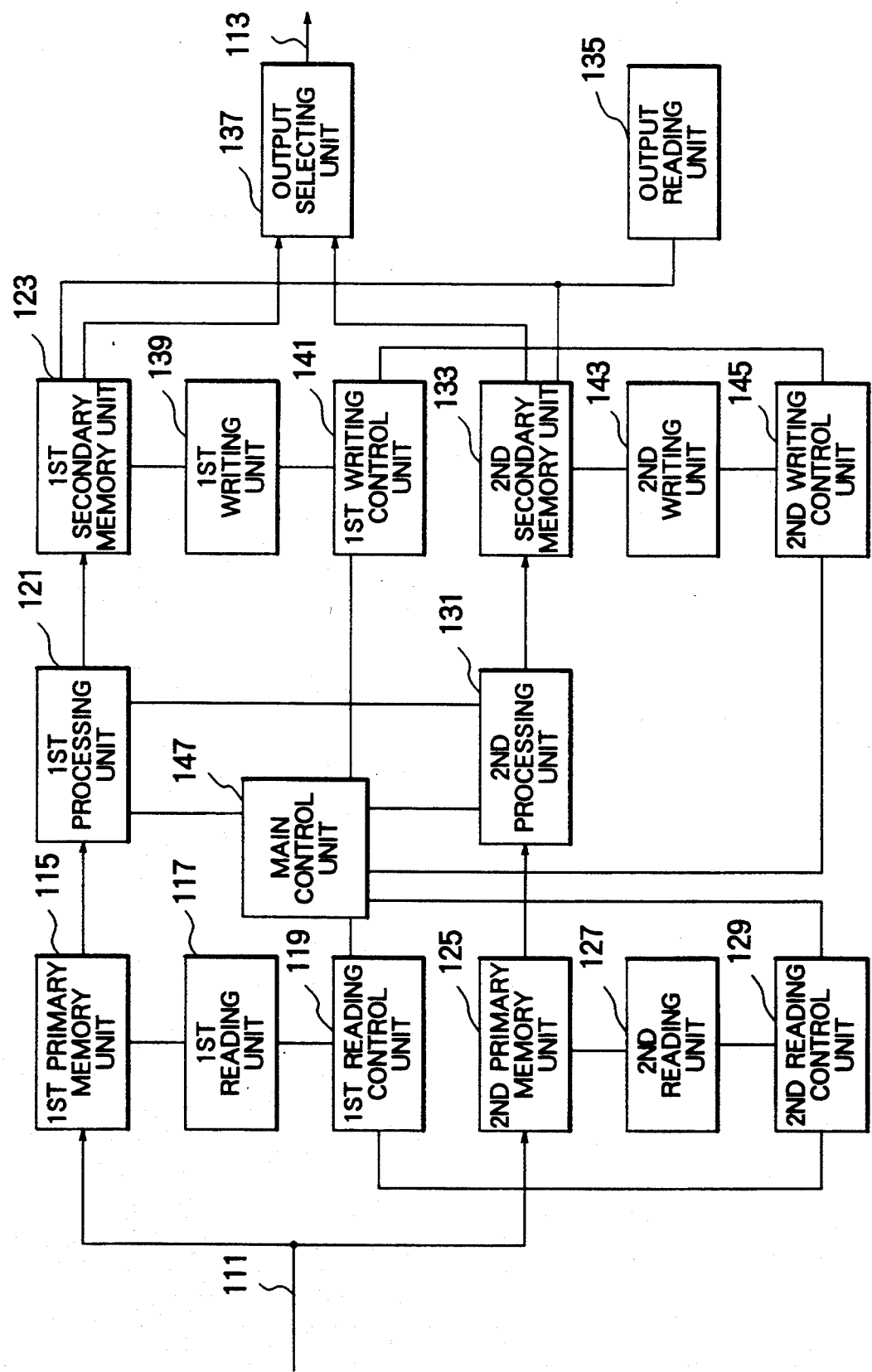
FIG. 6 is a block diagram of a cell processing system according to a sixth embodiment of this invention.

Referring to FIG. 6, the description will proceed to a cell processing system according to a sixth embodiment of this invention. Similar parts are designated by like reference numerals.

The cell processing system comprises a main control unit 147 which produces first, second, and third input control signals, first, second, and third processing control signals, and the first, the second, and third writing control signals.

The first reading control unit 119 is connected to the first reading unit 119 and to the main control unit 147 and produces the first reading signal when the first reading control unit 119 is supplied with the first input control signal. The first reading control unit 119 produces the first reading signal and the first reading start signal representing the start of the first reading signal when the first reading control unit 119 is supplied with the first and the third input control signals. The first reading control unit 119 produces the first reading signal when the first predetermined time interval lapses after the first reading control unit 119 is supplied with the second reading start signal.

The first processing unit 121 is connected to the first primary memory unit 115 and to the main control unit 147 and processes the first readout STM signal to produce the first ATM signal when the first processing unit 121 is supplied with the first processing control signal. The first processing unit 121 processes the first readout STM signal to produce the first ATM signal and the first processed content signal representing the process of the first processing unit 121 when the first processing unit 121 is supplied with the first and the third processing control signals. The first processing unit 121 processes, in response to the second processed content signal, the first readout STM signal to produce the first ATM signal when the first processing unit 121 is supplied with the second processed content signal.

The second reading control unit 129 is connected to the second reading unit 127, to the first reading control unit 119, and to the main control unit 147 and produces the second reading signal when the second reading control unit 129 is supplied with the second input control signal. The second reading control unit 129 produces the second reading signal and the second reading start signal representing the start of the second reading signal when the second reading control unit 129 is supplied with the second and the third input control signals. The second reading control unit 129 produces the second reading signal when the second predetermined time interval lapses after the second reading control unit 129 is supplied with the first reading start signal.

The second processing unit 131 is connected to the second primary memory unit 125, to the first processing unit 121, and to the main control unit 147 and processes the second readout STM signal to produce the second ATM signal when the second processing unit 131 is supplied with the second processing control signal. The second processing unit 131 processes the second readout STM signal to produce the second ATM signal and the second processed content signal representing the second process of the second processing unit 31 when the second processing unit 131 is supplied with the second and the third processing control signals. The second processing unit 131 processes, in response to the first processed content signal, the second readout STM signal to produce the second ATM signal when the second processing unit 131 is supplied with the first processed content signal. The second process of the second processing unit 31 is equal to the first process of the first processing unit 121.

The first writing unit 139 is connected to the first secondary memory unit 123 and writes the first ATM signal in the first secondary memory unit 123 as the first memorized ATM signal when the first writing unit 139 is supplied with the first writing signal.

The first writing control unit 141 is connected to the first writing unit 139 and to the main control unit 147 and produces the first writing signal when the first writing control unit 141 is supplied with the first writing control signal. The first writing control unit 141 produces the first writing signal and the first writing start signal representing the start of the first writing signal when the first writing control unit 141 is supplied with the first and the third writing control signals and produces the first writing signal when the primary determined time interval lapses after the first writing control unit is supplied with the second writing start signal.

The second writing unit 143 is connected to the second secondary memory unit 133 and writes the second ATM signal in the second secondary memory unit 133 as the second memorized ATM signal when the second writing unit is supplied with the second writing signal.

The second writing control unit 145 is connected to the second writing unit 143, to the first writing control unit 141, and to the main control unit 147 and produces the second writing signal when the second writing control unit 145 is supplied with the second writing control signal. The second writing control unit 145 produces the second writing signal and the second writing start signal representing a start of the second writing signal when the second writing control unit 145 is supplied with the second and the third writing control signals. The second writing control unit 145 produces the second writing signal when the secondary predetermined time interval lapses after the second writing control unit 145 is supplied with the first writing start signal.

Figure 7:
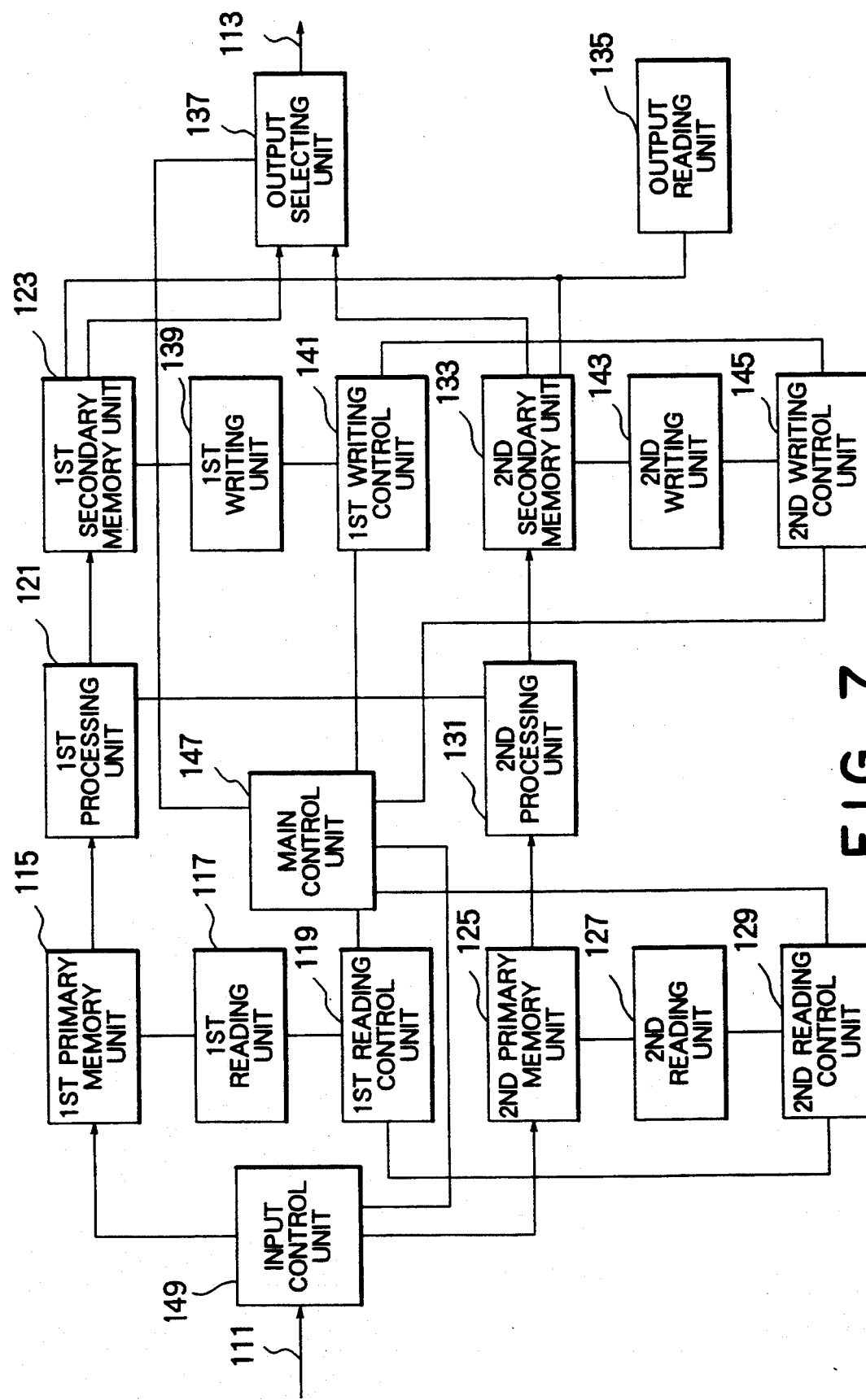
FIG. 7 is a block diagram of a cell processing system according to a seventh embodiment of this invention.

Referring to FIG. 7, the description will proceed to a cell processing system according to a seventh embodiment of this invention. Similar parts are designated by like reference numerals.

The cell processing system comprises the main control unit 147 which produces the first, the second, and the third input control signals, the first, the second, and the third writing control signals, and the first and the second selection signals. The cell processing system comprises an input control unit 149 connected to the main control unit 147 and receives the STM signal to produce the first STM signal when the input control unit 149 is supplied with the first input control signal, the second STM signal when the input control unit 149 is supplied with the second input control signal, and the first and the second STM signals when the input control unit 149 is supplied with the third input control signal. Each of the first and the second STM signals is equal to the STM signal.

The first primary memory unit 115 is connected to the input control unit 149 and receives the first STM signal to memorize the first STM signal as the first memorized STM signal. The second primary memory unit 125 is connected to the input control unit 149 and receives the second STM signal to memorize the second STM signal as the second memorized STM signal.

The output selecting unit 137 is connected to the first and the second secondary memory units 123 and 133 and to the main control unit 147 and selects one of the first and the second output ATM signals to output the one of the first and the second output ATM signals as the ATM signal when the output selecting unit 137 is supplied with one of the first and the second selection signals.

Figure 8:
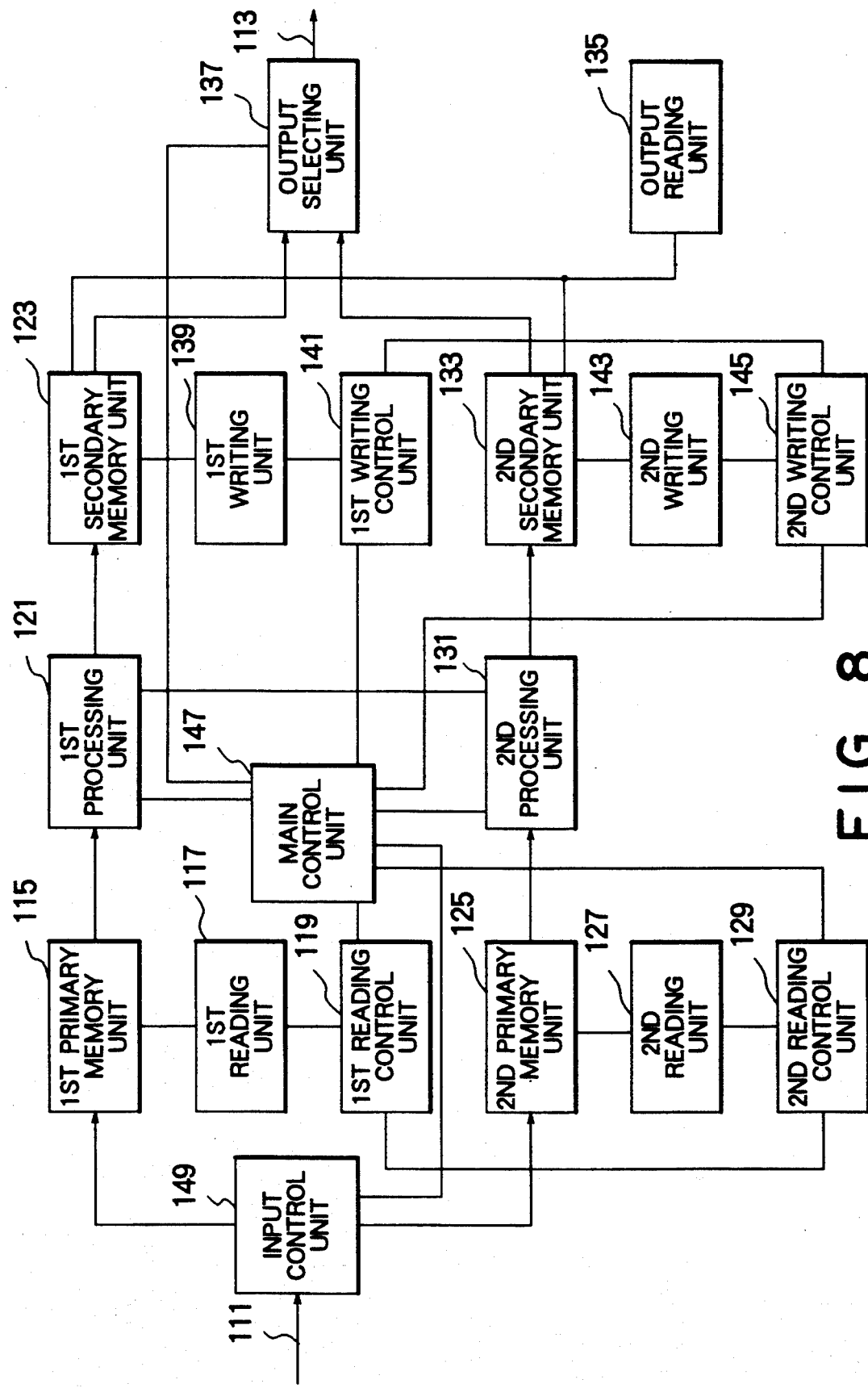
FIG. 8 is a block diagram of a cell processing system according to an eighth embodiment of this invention.

Referring to FIG. 8, the description will proceed to a cell processing system according to an eighth embodiment of this invention. Similar parts are designated by like reference numerals.

The cell processing system comprises the main control unit 147 which produces the first, the second, and the third input control signals, the first, the second, and the third processing control signals, the first, the second, and the third writing control signals, and the first and the second selection signals.

What is claimed is:

1. A cell processing system for processing an ATM signal into an STM signal, said cell processing system comprising:

a first primary memory unit for receiving said ATM signal to memorize said ATM signal as a first memorized ATM signal;

a first reading unit connected to said first primary memory unit for reading said first memorized ATM signal out of said first primary memory unit as a first readout ATM signal when said first reading unit is supplied with a first reading signal;

a first reading control unit connected to said first reading unit for producing said first reading signal and a first reading start signal representing a start of said first reading signal;

a first processing unit connected to said first primary memory unit for processing said first readout ATM signal to produce a first STM signal and a first processed content signal representing a process of said first processing units;

a first secondary memory unit connected to said first processing unit for receiving said first STM signal to memorize said first STM signal as a first memorized STM signals;

a second primary memory unit for receiving said ATM signal to memorize said ATM signal as a second memorized ATM signal;

a second reading unit connected to said second primary memory unit for reading said second memorized ATM signal out of said second primary memory unit as a second readout ATM signal when said second reading unit is supplied with a second reading signal;

a second reading control unit connected to said second reading unit and to said first reading control unit for producing said second reading signal when a first predetermined tame interval lapses after said second reading control unit is supplied with said first reading start signal;

a second processing unit connected to said second primary memory unit and to said first processing unit for processing, in response to said first processed content signal, said second readout ATM signal to produce a second STM signal;

a second secondary memory unit connected to said second processing unit for receiving said second STM signal to memorize said second STM signal as a second memorized STM signal;

an output reading unit connected to said first and said second secondary memory units for reading said first and said second memorized STM signal at the same time out of said first and said second secondary memory units as first and second output STM signals; and an output selecting unit connected to said first and said second secondary memory units for selecting one of said first and said second output STM signals to output said one of said first and said second output STM signals as said STM signal when said output selecting unit is supplied with one of first and second selection signals.

2. A cell processing system as claimed in claim 1, said cell processing system further comprising:

a first writing unit connected to said first secondary memory unit for writing said first STM signal in said first secondary memory unit as said first memorized STM signal when said first writing unit is supplied with a first writing signal;

a first writing control unit connected to said first writing unit for producing said first writing signal and a first writing start signal representing a start of said first writing signal;

a second writing unit connected to said second secondary memory unit for writing said second STM signal in said second secondary memory unit as said second memorized STM signal when said second writing unit is supplied with a second writing signal; and a second writing control unit connected to said second writing unit and to said first writing control unit for producing said second writing signal when a second predetermined time interval lapses after said second writing control unit is supplied with said first writing start signal.

3. A cell processing system for processing an ATM signal into an STM signal, said cell processing system comprising:

a main control unit for producing first, second, and third input control signals and first, second, and third processing control signals;

a first primary memory unit for receiving said ATM signal to memorize said ATM signal as a first memorized ATM signal;

a first reading unit connected to said first primary memory unit for reading said first memorized ATM signal out of said first primary memory unit as a first readout ATM signal when said first reading unit is supplied with a first reading signal;

a first reading control unit connected to said first reading unit and to said main control unit for producing said first reading signal when said first reading control unit is supplied with said first input control signal and for producing said first reading signal and a first reading start signal representing a start of said first reading signal when said first reading control unit is supplied with said first and said third input control signals and for producing said first reading signal when a first predetermined time interval lapses after said first reading control unit is supplied with a second reading start signal;

a first processing unit connected to said first primary memory unit and to said main control unit for processing said first readout ATM signal to produce a first STM signal when said first processing unit is supplied with said first processing control signal and for processing said first readout ATM signal to produce said first STM signal and a first processed content signal representing a process of said first processing unit when said first processing unit is supplied with said first and said third processing control signal and for processing, in response to a second processed content signal, said first readout ATM signal to produce said first STM signal when said first processing unit is supplied with said second processed content signal;

a first secondary memory unit connected to said first processing unit for receiving said first STM signal to memorize said first STM signal as a first memorized STM signal;

a second primary memory unit for receiving said ATM signal to memorize said ATM signal as a second memorized ATM signal;

a second reading unit connected to said second primary memory unit for reading said second memorized ATM signal out of said second primary memory unit as a second readout ATM signal when said second reading unit is supplied with a second reading signal;

a second reading control unit connected to said second reading unit, to said first reading control unit, and to said main control unit for producing said second reading signal when said second reading control unit is supplied with said second input control signal and for producing said second reading signal and said second reading start signal representing a start of said second reading signal when said second reading control unit is supplied with said second and said third input control signals and for producing said second reading signal when a second predetermined time interval lapses after said second reading control unit is supplied with said first reading start signal;

a second processing unit connected to said second primary memory unit, to said first processing unit, and to said main control unit for processing said second readout ATM signal to produce a second STM signal when said second processing unit is supplied with said second processing control signal and for processing said second readout ATM signal to produce said second STM signal and said second processed content signal representing a process of said second processing unit when said second processing unit is supplied with said second and said third processing control signal and for processing, in response to said first processed content signal, said second readout ATM signal to produce said second STM signal when said second processing unit is supplied with said first processed content signal;

a second secondary memory unit connected to said second processing unit for receiving said second STM signal to memorize said second STM signal as a second memorized STM signal;

an output reading unit connected to said first and said second secondary memory units for reading said first and said second memorized STM signal at the same time out of said first and said second secondary memory units as first and second output STM signals; and an output selecting unit connected to said first and said second secondary memory units for selecting one of said first and said second output STM signals to output said one of said first and said second output STM signals as said STM signal when said output selecting unit is supplied with one of first and second selection signals.

4. A cell processing system as claimed in claim 3, wherein said main control unit further produces first, second, and third writing control signals, said cell processing system further comprising:

a first writing unit connected to said first secondary memory unit for writing said first STM signal in said first secondary memory unit as said first memorized STM signal when said first writing unit is supplied with a first writing signal;

a first writing control unit connected to said first writing unit and to said main control unit for producing said first writing signal when said first writing control unit is supplied with said first writing control signal and for producing said first writing signal and a first writing start signal representing a start of said first writing signal when said first writing control unit is supplied with said first and said third writing control signals and for producing said first writing signal when a primary determined time interval lapses after said first writing control unit is supplied with a second writing start signal;

a second writing unit connected to said second secondary memory unit for writing said second STM signal in said second secondary memory unit as said second memorized STM signal when said second writing unit is supplied with a second writing signal; and a second writing control unit connected to said second writing unit, to said first writing control unit, and to said main control unit for producing said second writing signal when said second writing control unit is supplied with said second writing control signal and for producing said second writing signal and said second writing start signal representing a start of said writing signal when said second writing control unit is supplied with said second and said third writing control signals and for producing said second writing signal when a secondary predetermined time interval lapses after said second writing control unit is supplied with said first writing start signal.

5. A cell processing system for processing an ATM signal into an STM signal, said cell processing system comprising:

a main control unit for producing first, second, and third input control signals, and first and second selection signals;

an input control unit connected to said main control unit for receiving said ATM signal to produce a first ATM signal when said input control unit is supplied with said first input control signal, a second ATM signal when said input control unit is supplied with said second input control signal, and said first and said second ATM signals when said input control unit is supplied with said third input control signal, each of said first and said second ATM signals being equal to said ATM signal;

a first primary memory unit connected to said input control unit for receiving said first ATM signal to memorize said first ATM signal as a first memorized ATM signal;

a first reading unit connected to said first primary memory unit for reading said first memorized ATM signal out of said first primary memory unit as a first readout ATM signal when said first reading unit is supplied with a first reading signal;

a first reading control unit connected to said first reading unit for producing said first reading signal and a first reading start signal representing a start of said first reading signal;

a first processing unit connected to said first primary memory unit for processing said first readout ATM signal to produce a first STM signal and a first processed content signal representing a process of said first processing unit;

a first secondary memory unit connected to said first processing unit for receiving said first STM signal to memorize said first STM signal as a first memorized STM signal;

a second primary memory unit connected to said input control unit for receiving said second ATM signal to memorize said second ATM signal as a second memorized ATM signal;

a second reading unit connected to said second primary memory unit for reading said second memorized ATM signal out of said second primary memory unit as a second readout ATM signal when said second reading unit is supplied with a second reading signal;

a second reading control unit connected to said second reading unit and to said first reading control unit for producing said second reading signal when a first predetermined time interval lapses after said second reading control unit is supplied with said first reading start signal;

a second processing unit connected to said second primary memory unit and to said first processing unit for processing, in response to said first processed content signal, said second readout ATM signal to produce a second STM signal;

a second secondary memory unit connected to said second processing unit for receiving said second STM signal to memorize said second STM signal as a second memorized STM signal;

an output reading unit connected to said first and said second secondary memory units for reading said first and said second memorized STM signal at the same time out of said first and said second secondary memory units as first and second output STM signals; and an output selecting unit connected to said first and said second secondary memory units and to said main control unit for selecting one of said first and said second output STM signals to output said one of said first and said second output STM signals as said STM signal when said output selecting unit is supplied with one of said first and said second selection signals.

6. A cell processing system as claimed in claim 5, said cell processing system further comprising:

a first writing unit connected to said first secondary memory unit for writing said first STM signal in said first secondary memory unit as said first memorized STM signal when said first writing unit is supplied with a first writing signal;

a first writing control unit connected to said first writing unit and to said main control unit for producing said first writing signal and a first writing start signal representing a start of said first writing signal;

a second writing unit connected to said second secondary memory unit for writing said second STM signal in said second secondary memory unit as said second memorized STM signal when said second writing unit is supplied with a second writing signal; and a second writing control unit connected to said second writing unit, to said first writing control unit, and to said main control unit for producing said second writing signal when a second predetermined time interval lapses after said second writing control unit is supplied with said first writing start signal.

7. A cell processing system for processing an ATM signal into an STM signal, said cell processing system comprising:

a main control unit for producing first, second, and third input control signals, first, second, and third processing control signals, and first and second selection signals;

an input control unit connected to said main control unit for receiving said ATM signal to produce a first ATM signal when said input control unit is supplied with said first input control signal, a second ATM signal when said input control unit is supplied With said second input control signal, and said first and said second ATM signals when said input control unit is supplied with said third input control signal, each of said first and said second ATM signals being equal to said ATM signal;

a first primary memory unit connected to said input control unit for receiving said first ATM signal to memorize said first ATM signal as a first memorized ATM signal;

a first reading unit connected to said first primary memory unit for reading said first memorized ATM signal out of said first primary memory unit as a first readout ATM signal when said first reading unit is supplied with a first reading signal;

a first reading control unit connected to said first reading unit and to said main control unit for producing said first reading signal when said first reading control unit is supplied with said first input control signal and for producing said first reading signal and a first reading start signal representing a start of said first reading signal when said first reading control unit is supplied with said first and said third input control signals and for producing said first reading signal when a first predetermined time interval lapses after said first reading control unit is supplied with a second reading start signal;

a first processing unit connected to said first primary memory unit and to said main control unit for processing said first readout ATM signal to produce a first STM signal when said first processing unit is supplied with said first processing control signal and for processing said first readout ATM signal to produce said first STM signal and a first processed content signal representing a process of said first processing unit when said first processing unit is supplied with said first and said third processing control signal and for processing, in response to a second processed content signal, said first readout ATM signal to produce said first STM signal when said first processing unit is supplied with said second processed content signal;

a first secondary memory unit connected to said first processing unit for receiving said first STM signal to memorize said first STM signal as a first memorized STM signal;

a second primary memory unit connected to said input control unit for receiving said second ATM signal to memorize said second ATM signal as a second memorized ATM signal;

a second reading unit connected to said second primary memory unit for reading said second memorized ATM signal out of said second primary memory unit as a second readout ATM signal when said second reading unit is supplied with a second reading signal;

a second reading control unit connected to said second reading unit, to said first reading control unit, and to said main control unit for producing said second reading signal when said second reading control unit is supplied with said second input control signal and for producing said second reading signal and said second reading start signal representing a start of said second reading signal when said second reading control unit is supplied with said second and said third input control signals and for producing said second reading signal when a second predetermined time interval lapses after said second reading control unit is supplied with said first reading start signal;

a second processing unit connected to said second primary memory unit and to said main control unit for processing said second readout ATM signal to produce a second STM signal when said second processing unit is supplied with said second processing control signal and for processing said second readout ATM signal to produce said second STM signal and said second processed content signal representing a process of said second processing unit when said second processing unit is supplied with said second and said third processing control signal and for processing, in response to said first processed content signal, said second readout ATM signal to produce said second STM signal when said second processing unit is supplied with said first processed content signal;

a second secondary memory unit connected to said second processing unit for receiving said second STM signal to memorize said second STM signal as a second memorized STM signal;

an output reading unit connected to said first and said second secondary memory units for reading said first and said second memorized STM signal at the same time out of said first and said second secondary memory units as first and second output STM signals; and an output selecting unit connected to said first and said second secondary memory units and to said main control unit for selecting one of said first and said second output STM signals to output said one of said first and said second output STM signals as said STM signal when said output selecting unit is supplied with one of said first and said second selection signals.

8. A cell processing system as claimed in claim 7, wherein said main control unit further produces first, second, and third writing control signals, said cell processing system further comprising:

a first writing unit connected to said first secondary memory unit for writing said first STM signal in said first secondary memory unit as said first memorized STM signal when said first writing unit is supplied with a first writing signal;

a first writing control unit connected to said first writing unit and to said main control unit for producing said first writing signal when said first writing control unit is supplied with said first writing control signal and for producing said first writing signal and a first writing start signal representing a start of said first writing signal when said first writing control unit is supplied with said first and said third writing control signals and for producing said first writing signal when a primary determined time interval lapses after said first writing control unit is supplied with a second writing start signal;

a second writing unit connected to said second secondary memory unit for writing said second STM signal in said second secondary memory unit as said second memorized STM signal when said second writing unit is supplied with a second writing signal; and a second writing control unit connected to said second writing unit, to said first writing control unit, and to said main control unit for producing said second writing signal when said second writing control unit is supplied with said second writing control signal and for producing said second writing signal and said second writing start signal representing a start of said writing signal when said second writing control unit is supplied with said second and said third writing control signals and for producing said second writing signal when a secondary predetermined time interval lapses after said second writing control unit is supplied with said first writing start signal.

9. A cell processing system for processing an STM signal into an ATM signal, said cell processing system comprising:

a first primary memory unit for receiving said STM signal to memorize said STM signal as a first memorized STM signal;

a first reading unit connected to said first primary memory unit for reading said first memorized STM signal out of said first primary memory unit as a first readout STM signal when said first reading unit is supplied with a first reading signals;

a first reading control unit connected to said first reading unit for producing said first reading signal and a first reading start signal representing a start of said first reading signal;

a first processing unit connected to said first primary memory unit for processing said first readout STM signal to produce a first ATM signal and a first processed content signal representing a process of said first processing unit;

a first secondary memory unit connected to said first processing unit for receiving said first ATM signal to memorize said first ATM signal as a first memorized ATM signal;

a second primary memory unit for receiving said STM signal to memorize said STM signal as a second memorized STM signal;

a second reading unit connected to said second primary memory unit for reading said second memorized STM signal out of said second primary memory unit as a second readout STM signal when said second reading unit is supplied with a second reading signal;

a second reading control unit connected to said second reading unit and to said first reading control unit for producing said second reading signal when a first predetermined time interval lapses after said second reading control unit is supplied with said first reading start signal;

a second processing unit connected to said second primary memory unit and to said first processing unit for processing, in response to said first processed content signal, said second readout STM signal to produce a second ATM signal;

a second secondary memory unit connected to said second processing unit for receiving said second ATM signal to memorize said second ATM signal as a second memorized ATM signal;

an output reading unit connected to said first and said second secondary memory units for reading said first and said second memorized ATM signal at the same time out of said first and said second secondary memory units as first and second output ATM signals; and an output selecting unit connected to said first and said second secondary memory units for selecting one of said first and said second output ATM signals to output said one of said first and said second output ATM signals as said ATM signal when said output selecting unit is supplied with one of first and second selection signals.

10. A cell processing system as claimed in claim 9, said cell processing system further comprising:

a first writing unit connected to said first secondary memory unit for writing said first ATM signal in said first secondary memory unit as said first memorized ATM signal when said first writing unit is supplied with a first writing signals;

a first writing control unit connected to said first writing unit for producing said first writing signal and a first writing start signal representing a start of said first writing signal;

a second writing unit connected to said second secondary memory unit for writing said second ATM signal in said second secondary memory unit as said second memorized ATM signal when said second writing unit is supplied with a second writing signal; and a second writing control unit connected to said second writing unit and to said first writing control unit for producing said second writing signal when a second predetermined time interval lapses after said second writing control unit is supplied with said first writing start signal.

11. A cell processing system for processing an STM signal into an ATM signal, said cell processing system comprising:

a main control unit for producing first, second, and third input control signals and first, second, and third processing control signals;

a first primary memory unit for receiving said STM signal to memorize said STM signal as a first memorized STM signal;

a first reading unit connected to said first primary memory unit for reading said first memorized STM signal out of said first primary memory unit as a first readout STM signal when said first reading unit is supplied with a first reading signal;

a first reading control unit connected to said first reading unit and to said main control unit for producing said first reading signal when said first reading control unit is supplied with said first input control signal and for producing said first reading signal and a first reading start signal representing a start of said first reading signal when said first reading control unit is supplied with said first and said third input control signals and for producing said first reading signal when a first predetermined time interval lapses after said first reading control unit is supplied with a second reading start signal;

a first processing unit connected to said first primary memory unit and to said main control unit for processing said first readout STM signal to produce a first ATM signal when said first processing unit is supplied with said first processing control signal and for processing said first readout STM signal to produce said first ATM signal and a first processed content signal representing a process of said first processing unit when said first processing unit is supplied with said first and said third processing control signal and for processing, in response to a second processed content signal, said first readout STM signal to produce said first ATM signal when said first processing unit is supplied with said second processed content signal;

a first secondary memory unit connected to said first processing unit for receiving said first ATM signal to memorize said first ATM signal as a first memorized ATM signal;

a second primary memory unit for receiving said STM signal to memorize said STM signal as a second memorized STM signal;

a second reading unit connected to said second primary memory unit for reading said second memorized STM signal out of said second primary memory unit as a second readout STM signal when said second reading unit is supplied with a second reading signal;

a second reading control unit connected to second reading unit, to said first reading control unit, and to said main control unit for producing said second reading signal when said second reading control unit is supplied with said second input control signal and for producing said second reading signal and said second reading start signal representing a start of said second reading signal when said second reading control unit is supplied with said second and said third input control signals and for producing said second reading signal when a second predetermined time interval lapses after said second reading control unit is supplied with said first reading start signal;

a second processing unit connected to said second primary memory units to said first processing unit, and to said main control unit for processing said second readout STM signal to produce a second ATM signal when said second processing unit is supplied with said second processing control signal and for processing said second readout STM signal to produce said second ATM signal and said second processed content signal representing a process of said second processing unit when said second processing unit is supplied with said second and said third processing control signal and for processing, in response to said first processed content signal, said second readout STM signal to produce said second ATM signal when said second processing unit is supplied with said first processed content signal;

a second secondary memory unit connected to said second processing unit for receiving said second ATM signal to memorize said second ATM signal as a second memorized ATM signal;

an output reading unit connected to said first and said second secondary memory units for reading said first and said second memorized ATM signal at the same time out of said first and said second secondary memory units as first and second output ATM signals; and an output selecting unit connected to said first and said second secondary memory units for selecting one of said first and said second output ATM signals to output said one of said first and said second output ATM signals as said ATM signal when said output selecting unit is supplied with one of first and second selection signals.

12. A cell processing system as claimed in claim 11, wherein said main control unit further produces first, second, and third writing control signals, said cell processing system further comprising:

a first writing unit connected to said first secondary memory unit for writing said first ATM signal in said first secondary memory unit as said first memorized ATM signal when said first writing unit is supplied with a first writing signal;

a first writing control unit connected to said first writing unit and to said main control unit for producing said first writing signal when said first writing control unit is supplied with said first writing control signal and for producing said first writing signal and a first writing start signal representing a start of said first writing signal when said first writing control unit is supplied with said first and said third writing control signals and for producing said first writing signal when a primary determined time interval lapses after said first writing control unit is supplied with a second writing start signal;

a second writing unit connected to said second secondary memory unit for writing said second ATM signal in said second secondary memory unit as said second memorized ATM signal when said second writing unit is supplied with a second writing signal; and a second writing control unit connected to said second writing unit, to said first writing control unit, and to said main control unit for producing said second writing signal when said second writing control unit is supplied with said second writing control signal and for producing said second writing signal and said second writing start signal representing a start of said writing signal when said second writing control unit is supplied with said second and said third writing control signals and for producing said second writing signal when a secondary predetermined time interval lapses after said second writing control unit is supplied with said first writing start signal.

13. A cell processing system for processing an STM signal into an ATM signal, said cell processing system comprising:

a main control unit for producing first, second, and third input control signals, and first and second selection signals;

an input control unit connected to said main control unit for receiving said STM signal to produce a first STM signal when said input control unit is supplied with said first input control signal, a second STM signal when said input control unit is supplied with said second input control signal, and said first and said second STM signals when said input control unit is supplied with said third input control signal, each of said first and said second STM signals being equal to said STM signal;

a first primary memory unit connected to said input control unit for receiving said first STM signal to memorize said first STM signal as a first memorized ATM signal;

a first reading unit connected to said first primary memory unit for reading said first memorized STM signal out of said first primary memory unit as a first readout STM signal when said first reading unit is supplied with a first reading signal;

a first reading control unit connected to said first reading unit for producing said first reading signal and a first reading start signal representing a start of said first reading signal;

a first processing unit connected to said first primary memory unit for processing said first readout STM signal to produce a first ATM signal and a first processed content signal representing a process of said first processing unit;

a first secondary memory unit connected to said first processing unit for receiving said first ATM signal to memorize said first ATM signal as a first memorized ATM signal;

a second primary memory unit connected to said input control unit for receiving said second STM signal to memorize said second STM signal as a second memorized STM signal;

a second reading unit connected to said second primary memory unit for reading said second memorized STM signal out of said second primary memory unit as a second readout STM signal when said second reading unit is supplied with a second reading signal;

a second reading control unit connected to said second reading unit and to said first reading control unit for producing said second reading signal when a first predetermined time interval lapses after said second reading control unit is supplied with said first reading start signal;

a second processing unit connected to said second primary memory unit and to said first processing unit for processing, in response to said first processed content signal, said second readout STM signal to produce a second ATM signal;

a second secondary memory unit connected to said second processing unit for receiving said second ATM signal to memorize said second ATM signal as a second memorized ATM signal;

an output reading unit connected to said first and said second secondary memory units for reading said first and said second memorized ATM signal at the same time out of said first and said second secondary memory units as first and second output ATM signals; and an output selecting unit connected to said first and said second secondary memory units and to said main control unit for selecting one of said first and said second output ATM signals to output said one of said first and said second output ATM signals as said ATM signal when said output selecting unit is supplied with one of said first and said second selection signals.

14. A cell processing system as claimed in claim 13, said cell processing system further comprising:

a first writing unit connected to said first secondary memory unit for writing said first ATM signal in said first secondary memory unit as said first memorized ATM signal when said first writing unit is supplied with a first writing signal;

a first writing control unit connected to said first writing unit and to said main control unit for producing said first writing signal and a first writing start signal representing a start of said first writing signal;

a second writing unit connected to said second secondary memory unit for writing said second ATM signal in said second secondary memory unit as said second memorized ATM signal when said second writing unit is supplied with a second writing signal; and a second writing control unit connected to said second writing unit, to said first writing control unit, and to said main control unit for producing said second writing signal when a second predetermined time interval lapses after said second writing control unit is supplied with said first writing start signal.

15. A cell processing system for processing an STM signal into an ATM signal, said cell processing system comprising:

a main control unit for producing first, second, and third input control signals, first, second, and third processing control signals, and first and second selection signals;

an input control unit connected to said main control unit for receiving said STM signal to produce a first STM signal when said input control unit is supplied with said first input control signal, a second STM signal when said input control unit is supplied with said second input control signal, and said first and said second STM signals when said input control unit is supplied with said third input control signal, each of said first and said second STM signals being equal to said STM signal;

a first primary memory unit connected to said input control unit for receiving said first STM signal to memorize said first STM signal as a first memorized STM signal;

a first reading unit connected to said first primary memory unit for reading said first memorized STM signal out of said first primary memory unit as a first readout STM signal when said first reading unit is supplied with a first reading signal;

a first reading control unit connected to said first reading unit and to said main control unit for producing said first reading signal when said first reading control unit is supplied with said first input control signal and for producing said first reading signal and a first reading start signal representing a start of said first reading signal when said first reading control unit is supplied with said first and said third input control signals and for producing said first reading signal when a first predetermined time interval lapses after said first reading control unit is supplied with a second reading start signal;

a first processing unit connected to said first primary memory unit and to said main control unit for processing said first readout STM signal to produce a first ATM signal when said first processing unit is supplied with said first processing control signal and for processing said first readout STM signal to produce said first ATM signal and a first processed content signal representing a process of said first processing unit when said first processing unit is supplied with said first and said third processing control signal for processing, in response to a second processed content signal, said first readout STM signal to produce said first ATM signal when said first processing unit is supplied with said second processed content signal;

a first secondary memory unit connected to said first processing unit for receiving said first ATM signal to memorize said first ATM signal as a first memorized ATM signal;

a second primary memory unit connected to said input control unit for receiving said second STM signal to memorize said second STM signal as a second memorized STM signal;

a second reading unit connected to said second primary memory unit for reading said second memorized STM signal out of said second primary memory unit as a second readout STM signal when said second reading unit is supplied with a second reading signal;

a second reading control unit connected to said second reading unit, to said first reading control unit, and to said main control unit for producing said second reading signal when said second reading control unit is supplied with said second input control signal and for producing said second reading signal and said second reading start signal representing a stark of said second reading signal when said second reading control unit is supplied with said second and said third input control signals and for producing said second reading signal when a second predetermined time interval lapses after said second reading control unit is supplied with said first reading start signal;

a second processing unit connected to said second primary memory unit and to said main control unit for processing said second readout STM signal to produce a second ATM signal when said second processing unit is supplied with said second processing control signal and for processing said second readout STM signal to produce said second ATM signal and said second processed content signal representing a process of said second processing unit when said second processing unit is supplied with said second and said third processing control signal and for processing, in response to said first processed content signal, said second readout STM signal to produce said second ATM signal when said second processing unit is supplied with said first processed content signal;

a second secondary memory unit connected to said second processing unit for receiving said second ATM signal to memorize said second ATM signal as a second memorized ATM signal;

an output reading unit connected to said first and said second secondary memory units for reading said first and said second memorized ATM signal at the same time out of said first and said second secondary memory units as first and second output ATM signals; and an output selecting unit connected to said first and said second secondary memory units end to said main control unit for selecting one of said first and said second output ATM signals to output said one of said first and said second output ATM signals as said ATM signal when said output selecting unit is supplied with one of said first and said second selection signals.

16. A cell processing system as claimed in claim 15, wherein said main control unit further produces first, second, and third writing control signals, said cell processing system further comprising:

a first writing unit connected to said first secondary memory unit for writing said first ATM signal in said first secondary memory unit as said first memorized ATM signal when said first writing unit is supplied with a first writing signal;

a first writing control unit connected to said first writing unit and to said main control unit for producing said first writing signal when said first writing control unit is supplied with said first writing control signal and for producing said first writing signal and a first writing start signal representing a start of said first writing signal when said first writing control unit is supplied with said first and said third writing control signals and for producing said first writing signal when a primary determined time interval lapses after said first writing control unit is supplied with a second writing start signal;

a second writing unit connected to said second secondary memory unit for writing said second ATM signal in said second secondary memory unit as said second memorized ATM signal when said second writing unit is supplied with a second writing signal; and a second writing control unit connected to said second writing unit, to said first writing control unit, and to said main control unit for producing said second writing signal when said second writing control unit is supplied with said second writing control signal and for producing said second writing signal and said second writing start signal representing a start of said writing signal when said second writing control unit is supplied with said second and said third writing control signals and for producing said second writing signal when a secondary predetermined time interval lapses after said second writing control unit is supplied with said first writing start signal.

* * * * *